April 22, 1969
G. J. GREENE, JR
3,440,396
MOISTURE AND SNOW DETECTOR
Filed Nov. 22, 1965
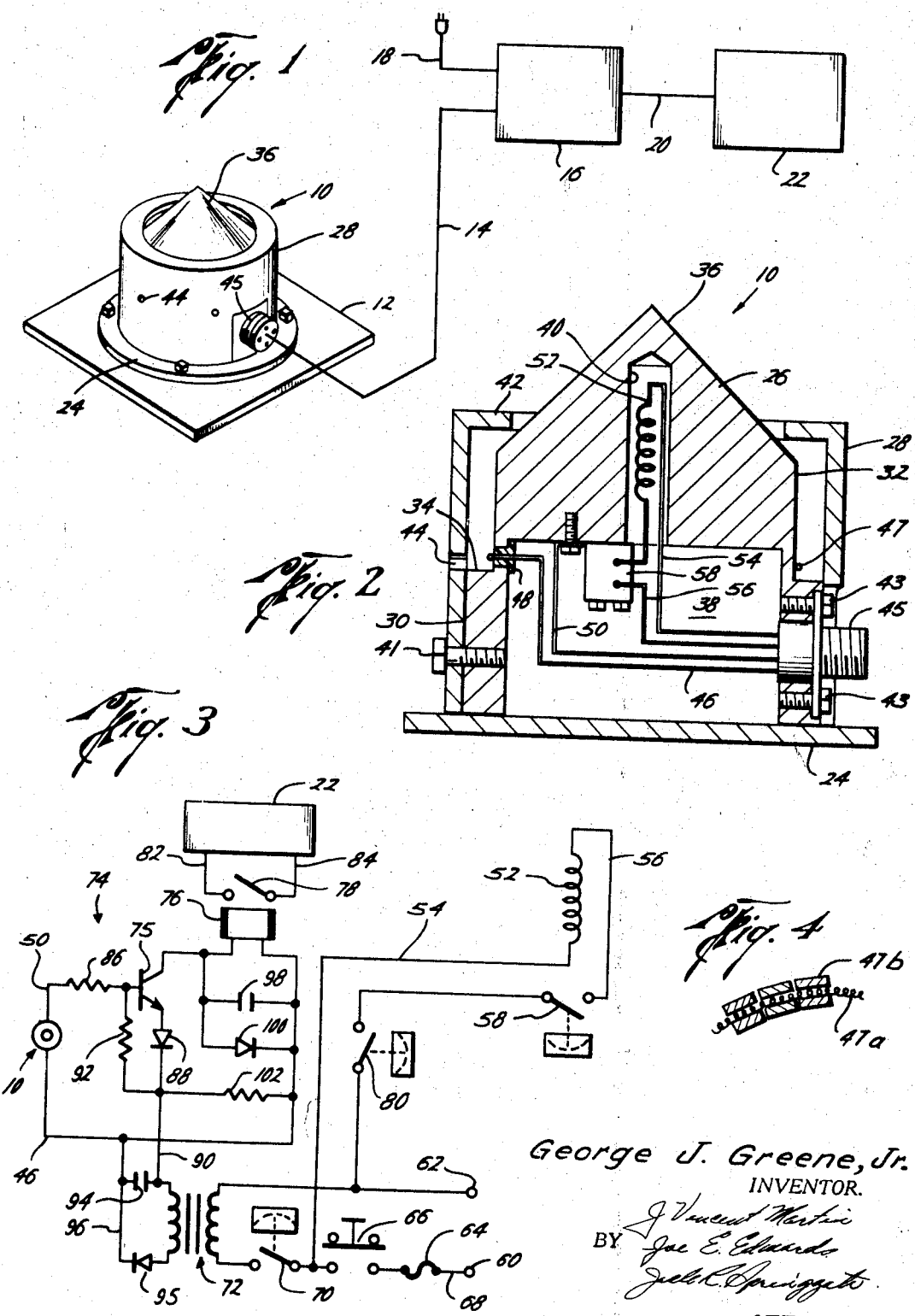
George J. Greene, Jr.
INVENTOR.
BY
ATTORNEYS

United States Patent Office 3,440,396
Patented Apr. 22, 1969

3,440,396
MOISTURE AND SNOW DETECTOR
George J. Greene, Jr., Shreveport, La., assignor, by mesne assignments, to UGC Industries, Inc., a corporation of Texas
Filed Nov. 22, 1965, Ser. No. 508,915
Int. Cl. H05b 1/02
U.S. Cl. 219—201                    10 Claims

ABSTRACT OF THE DISCLOSURE

A moisture detecting device having a member with an anodized surface, a pair of leads, one lead being connected to the member and the other being in contact with the anodized surface so that wetting of the anodized surface provides an electrical connection between the leads. When used as a snow detector, a thermostat is included to activate the leads when temperatures fall to approximately 34° F.

---

The present invention relates to an improved device for detecting moisture and, in one application, particularly to a device for detecting snow to provide a suitable output signal responsive to such detection.

A device which will detect the presence of liquid moisture, such as rain or the presence of snow, can be used to protect property or assure operativeness of equipment. As an example, railroad track switching mechanisms may not function properly when covered by snow. By utilizing the present invention to detect snow, the output of the device may be used to start a heater which will assure proper operation of the track switching mechanism even during a snow storm.

Therefore, an object of the present invention is to provide an improved device which will detect liquid moisture on a surface and provide an output signal responsive to its detection of liquid moisture.

Another object of the present invention is to provide an improved snow detection device with an output signal responsive to the detection of snow.

A further object is to provide an improved snow-detecting device which detects the water of melted snow with provisions for responding to water only under probably snow conditions.

Still another object is to provide an improved moisture-sensitive switch device in an electric circuit having an output signal when such circuit is completed through such switch device by water.

Still a further object is to provide an improved snow-detecting device having a means to melt snow and a water-detecting device operative only at temperatures when precipitation is most probably snow.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIGURE 1 is a perspective view of the device of the present invention which includes a wiring panel and a device to which the output is conducted.

FIGURE 2 is a vertical sectional view of the sensing device of the present invention.

FIGURE 3 is a schematic wiring diagram of a circuit to be used in the device of the present invention.

FIGURE 4 is a partial sectional view of a modified form of the special lead used in the device of the present invention.

While it is generally known that an anodized surface on an aluminum body is electrically insulating, it has been discovered that the anodized oxide layer becomes conductive when wet. The exact mechanism of the phenomenon whereby wetting of such coating renders the coating conductive is not completely understood. The present invention utilizes such a normally nonconducting coating to detect the presence of liquid moisture by completing a circuit through the coating at the point of wetting of the coating. By the addition of a heater and suitable circuitry as hereinafter described, the device can be made to operate as a snow detector. More accurately, the device will detect precipitation under such conditions that the detected precipitation is most probably snow, freezing rain, sleet or some other form likely to create icing conditions.

Referring to the drawings, the device illustrated in FIGURE 1 includes the moisture-sensing device 10 positioned on a surface 12 in a location where it is desirable to detect snow or icing conditions. The sensing device 10 is connected by a suitable electric line 14 to the electric panel box 16 to which a suitable source of electric potential is connected by the line 18. The output is connected by the line 20 to a suitable output responsive means 22. In the application of a snow detector form of the present invention, such output responsive means 22 could be a relighter for a heater which is to melt any snow or ice collecting in the location and thereby prevent a failure resulting from the collection of unmelted snow or ice or avoid the danger of icing conditions.

The sensing device 10 is shown in detail in FIGURE 2 and includes a base 24 for mounting the member 26 which has the dry-insulating, wet conductive surface 32 by which liquid moisture sensing is accomplished. The jacket 28 surrounds the surface 30 of the member 26 and provides protection for the surface 32 from trash as hereinafter explained. As shown, the surface 32 will be an anodized surface when the member 26 is aluminum. The surface 32 will function as a switch to provide a connection when wet between special lead 47 which is positioned on surface 32 and the lead 50 which is secured to the member 26 and to insulate between such leads when dry. The extent to which the member 26 is anodized may vary provided that the portion of surface 32 under the special lead 47 is completely anodized. In the form illustrated the upper portion of member 26 is provided with the conical surface 36 which functions to receive and direct the water downwardly into contact with the surface 32. The interior of member 26 is provided with the recess 38 to contain the necessary electric components and with the heater recess 40 extending into the conical portion of member 26. The location of the heater recess 40 in proximity to the surface 36 allows the heater to be positioned close to the surface 36 on which snow will fall.

The jacket 28 is secured to the member 26 by suitable fasteners 41 and includes the inwardly extending flange 42 which protects the surface 32 from trash and debris while allowing the water on surface 36 to be directed downwardly onto the moisture-responsive surface 32. A drain port 44 extends through jacket 28 to allow liquid collecting on the shoulder 34 to be drained therefrom.

A portion of the aforementioned circuitry extends into the device 10 with line 14 connected to the socket connection 45 as shown in FIGURE 1. A suitable electric lead 46 extends from the socket 45 in the wall of member 26 across recess 38 through the wall to surface 32. Socket 45 is secured to member 26 by the fasteners 43. Lead 46 is insulated in passing through the wall of member 26 by the insulator 48. Lead 46 connects to a special lead 47 which extends around member 26 in contact with the surface 32.

It is preferred that the electric lead 47 be made of the relatively new nonmetallic conductors, such as the carbon impregnated plastics; e.g., polytetrafluoroethylene. Further, it should have a spring tension which will keep it in contact with cylindrical surface 32 at a position above shoulder 34. Metallic conductors have been used for the lead 46, but in operation they become part of an electrolytic cell circuit and tend to be sacrificed in such circuit. Another structure (shown schematically in FIGURE 4) which may be used for lead 47 is to provide a relatively small-diameter coiled tension spring 47a threaded through a plurality of small carbon blocks 47b and connected back to itself after being positioned around cylindrical surface 32. With this form of electric lead the carbon blocks are sacrificed, but they should have sufficient diameter to provide a reasonable service life. Further, the loss of the carbon does not affect the spring which holds the leads in contact with the surface 32. The lead 50 is connected to member 26 within recess 38 by the screw 51 and will positively complete a circuit, hereinafter described, from lead 46 through the surface 32 and the member 26 even if the interior of recess 38 has been anodized.

When the device 10 is used as a snow detector, a heater is provided to melt the snow on conical surface 36. The heater 52 is positioned within the heater recess 40 and is provided with two leads 54 and 56, one of which extends through the thermostat switch 58. The leads 46, 50, 54 and 56 extend through socket 45 in the wall of member 26 and jacket 28 into the line 14 to connect to the panel box 16.

In the preferred form of the invention the member 26 will be made of aluminum or a suitable aluminum alloy, and the outer surface thereof will be anodized. It is of particular importance that the surface 32 be provided with adequate anodizing in the area under the special lead 47 so that the surface coating will provide an electrical insulation except when wet. When the coating on surface 32 is wet, it will conduct electricity and thereby complete the circuit between the leads 46, the special lead 47 and the lead 50.

The schematic wiring diagram of FIGURE 3 shows complete electrical circuitry for a snow detector. The sensing device 10 is connected to the leads 46 and 50 and comprises a portion of the sensing circuit. The thermostat switch 58, the heater 52 and the leads 54 and 56 are also shown. A suitable potential 110-volt, 60-cycle alternating current is supplied across the terminals 60 and 62. Such potential is supplied to the heater circuit and the sensing circuit as shown. A fuse 64 and a switch 66 are connected in the lead 68 from the terminal 60. The lead 68 also connects through the thermostat switch 70 when closed through the primary of the step-down transformer 72 to terminal 62. The secondary of transformer 72 is connected into the sensing circuit with leads 46 and 50, the amplifier 74 and the output solenoid 76 which operates the switch 78. In a typical circuit the output of the transformer 72 could be 12 volts. The heater leads 54 and 56 are connected to the power supply, as shown, with the thermostat switch 80 connected between lead 56 and the lead to terminal 62.

Suitable resistors, capacitors, diodes and a transistor, as shown, are provided to obtain proper amplification and output of the sensory circuit. The switch 78 is connected to leads 82 and 84 extending to the output responsive means 22. Connections for the transistor 75 are provided from the device 10 to properly amplify the current flow therethrough to actuate solenoid 76. In particular, the resistor 86 is connected between lead 50 and the base connection of transistor 75. The diode 88 is connected between the emitter of transistor 75 and the lead 90 from the secondary winding of transformer 72. The resistor 92 is connected between the base connection of transistor and the lead 90. The capacitor 94 is connected across the secondary winding of transformer 72 to the leads 90 and 96. The diode 95 is connected in the lead 96. The solenoid 76 is connected to the collector of transistor 75 and to the lead 96. The capacitor 98 and the diode 100 are connected in parallel with the solenoid 76. The resistor 102 is connected between leads 96 and 90. The lead 46 from the sensing device 10 is connected to the lead 96.

In operation the device of the present invention as illustrated and described will function as a detector for snow. With the sensing device 10 positioned in the location where it is desired that snow be detected, the potential will be supplied across terminals 60 and 62 through the lead 18. With the manual switch 66 closed, the unit will be operative. The thermostat switch 70 for snow detection will be set to complete the circuit to the primary winding of transformer 72 only when the temperature in the vicinity of the detector is approximately 34° F. or lower. Thus, the circuit to the sensing device 10 will not be energized unless the temperature is low enough that any precipitation will probably fall as snow. The heater circuit will be energized when switch 66 is closed provided both thermostat switches 80 and 58 are closed. In this form the thermostat switch 80 is set to close at approximately 37° F. Thus, the heater circuit will be energized and working before the sensing circuit becomes energized by the closing of switch 70. The thermostat switch 58 will be set to open when the temperature of the surface of the member 26 is approximately 150° F. This temperature will be sufficiently high to assure that snow which falls on the member 26 will be melted.

Assuming that the device is operative with a potential supplied across the primary winding of transformer 72 and to the heater 52 when snow fall commences, the snow falling on member 26 will be melted by the heater 52. The water from the melted snow will run down the conical surface 36 and the surface 32 and contact a portion of lead 47. When the water from melted snow makes this contact, the sensing circuit will be completed through the anodized coating and the wall of member 26 and will energize solenoid 76 to close switch 78 and thereby energize the relighter mechanism 22 or any other suitable protective device.

Temperature control of the surface of member 26 is necessary to prevent vaporization of the precipitation before it reaches lead 47. The thermostat switch 58 will open whenever the surface temperature of member 26 reaches 150° F. Such an overheat control is necessary if the heater 52 has sufficient capacity to raise the temperature of member 26 rapidly. Vaporization of the water from melted snow before contact with the lead 47 would prevent detection of snow. The thermostat 80 is set to activate the heater circuit at a sightly higher temperature than the temperature at which thermostat 70 actuates the sensing circuit. This allows the heater 52 to warm the member 26 at least slightly before the sensing circuit is activated. This feature is particularly advantageous during periods of rapidly falling temperatures.

The sensing device 10 may be used to detect moisture by eliminating the thermostat switch 70 or by providing a by-pass around such switch. It should be noted that even when it is to function to detect snow that it will detect rain which may occur at temperatures of 34° F. and lower. In most applications it will be desired to detect all precipitation at such low temperatures since a freezing rain may be at least as serious as snow. When the sensing device is operated to detect rain at higher temperatures, it will function in the manner previously described to actuate the solenoid 76 whenever the anodized coating in contact with the lead 47 is wet to complete the circuit between lead 46, lead 47 and lead 50.

Once the circuit through the sensing device 10 has been completed, it will hold solenoid 76 in actuated position maintaining switch 78 closed until the circuit is interrupted by the drying of the anodized coating on the member 26 or by the opening of one of the switches. The heating of the member 26 by the heater 52 will accelerate the drying of the anodized surface of member 26 once the snowfall has stopped.

The device of the present invention is particularly advantageous since it will detect the advent of precipitation with the very first drop to provide contact between the special lead 47 and the anodized surface 32 of the member 26. While the foregoing description of the device 10 has been related to its use for detection of precipitation, it should be understood that it will detect the presence of any liquid whch, when in contact with the lead 47 and the surface 32, will complete the electrical crcuit through the anodized coating.

It is recommended that the exposed surface be inclined to direct drops of water toward the lead 47. Variations of structure to change the exposed surface in relation to the lead 47 may be made without departing from the invention. The particular configuration illustrated has been found to be successful for the detection of snow.

From the foregoing it can be seen that the device of the present invention will provide a liquid moisture-sensitive switch in a circuit which may be made responsive to the presence of water, of precipitation or precipitation which is probably snow. This device utilizes the dry-insulating, wet-conductive properties of an anodized aluminum to provide the liquid moisture-sensitive switch.

The foregoing disclosure and description of the invention are illustrative and explanatory thereof and various changes in the size, shape and materials, as well as in the details of the illusrtated construction, may be made within the scope of the appended claims without departing from the spirit of the invention.

What is claimed is:

1. A snow-detecting device, comprising
an aluminum member,
one surface of said member being anodized,
a first electric lead connected to said member,
a second electric lead in contact with said anodized surface of said member,
said anodized surface of said member being exposed to weather,
means for heating the anodized surface of said member to melt snow on said surface,
said anodized surface when wet from melted snow at a point of contact with said second lead providing an electrical connection between said first and said second leads,
a source of electric potential, and
thermostat switch means connected between said leads and said source of electric potential,
said thermostat switch means being normally open, closing when the temperature is slightly above freezing temperature of water and remaining closed at lower temperatures whereby wetting of said anodized surface only completes a circuit when said thermostat switch is closed,
said second electric lead is positioned at a low point on said anodized surface whereby the water of melted snow is directed downwardly to said lead to complete the electrical circuit.

2. A snow-detector device, comprising
an aluminum member,
one surface of said member being anodized,
a first electric lead connected to said member,
a second electric lead in contact with said anodized surface of said member,
said anodized surface of said member being exposed to weather,
means for heating the anodized surface of said member to melt snow on said surface,
said anodized surface when wet from melted snow at a point of contact with said second lead providing an electrical connection between said first and said second leads,
a source of electric potential,
thermostat switch means connected between said leads and said source of electric potential,
said thermostat switch means being normally open, closing when the temperature is slightly above freezing temperature of water and remaining closed at lower temperatures whereby wetting of said anodized surface only completes a circuit when said thermostat switch is closed, and
a second thermostat switch responsive to the temperature of the air to which the device is exposed and connected to said heating means and preset to close the circuit to said heating means at a temperature slightly above the temperature at which the other thermostat switch closes the circuit between said leads and said electric potential.

3. A snow detector according to claim 2, including
a third thermostat switch responsive to the temperature of the heated surface and connected to said heating means to open when the temperature of said heated surface reaches a preselected maximum desired temperature.

4. A moisture-sensing device, comprising
an aluminum member having a cylindrical side and a conical top,
said cylindrical side surface of said aluminum member being anodized,
a first lead connected to said member,
a second lead positioned in contact around the lower portion of said anodized cylindrical surface,
a source of electric potential connected to said leads, and
output means connected in the circuit defined by said leads, said member, and said source of electric potential whereby when said circuit is completed, said output means is energized,
the surface of said conical top of said member being sloped downwardly toward said anodized cylindrical surface of said member whereby water on said conical top runs downwardly on said conical top and said cylindrical side to complete a circuit through said anodized surface between said second lead and said member.

5. A moisture-sensing device, comprising
an aluminum member,
one exterior surface of said aluminum member being anodized,
a first electric lead connected to said member,
a second electric lead in contact with said anodized surface of said member,
a source of electric potential connected to said leads,
means resiliently biasing said second lead against said anodized surface of said member, and
output means connected in the circuit defined by said leads, said member, and said source of electric potential whereby when water completes the circuit through said anodized surface, said output means is energized.

6. A moisture-sensing device according to claim 5 wherein said second electric lead is
a non-metallic conductor.

7. A moisture-sensing device according to claim 5 wherein said second electric lead is
a carbon impregnated plastic.

8. A moisture-sensing device according to claim 5 wherein said second electric lead includes
a tension spring surrounding said member, and
a plurality of carbon blocks mounted on said spring and engaging said anodized surface of said member to support said spring outwardly from said surface.

9. A snow detector, comprising
an aluminum member having a cylindrical side and a conical top,
the surface of said cylindrical side of said aluminum member being anodized,
a first lead connected to said member,
a second lead positioned in contact around the lower portion of said anodized cylindrical surface.
a source of electric potential connected to said leads, thermostat switch means connected between said leads and said source of electric potential, said switch means being normally open and adapted to close when temperatures to which it is exposed fall to approximately 34° F. and to remain closed at lower temperatures, a heater positioned within said member and adapted to heat said conical top, and an output means connected in the circuit defined by said leads, said member, said thermostat switch and said source of electric potential whereby when said circuit is completed said output means is energized, the surface of said conical top of said member being sloped downwardly toward said anodized cylindrical surface of said member whereby snow collecting on said conical surface which is melted by said heater flows as water downwardly on said conical top and said cylindrical surface to complete the circuit through said anodized surface between said second lead and said member to energize said output means.

10. A snow detector according to claim 9 including a jacket surrounding said member, said jacket being spaced outwardly from said cylindrical surface and defining an inwardly extending flange terminating in spaced relationship with the lower portion of said conical surface, whereby said jacket protects against the accumulation of trash in the space surrounding said cylindrical surface.

References Cited

UNITED STATES PATENTS

| | | | |
|---|---|---|---|
| 2,237,006 | 4/1941 | Koller | 338—35 |
| 2,717,957 | 9/1955 | Ohlheiser | 338—35 X |
| 2,787,695 | 4/1957 | Dyke | 340—234 X |
| 3,083,573 | 4/1963 | Shaw | 73—336.5 |
| 3,157,800 | 11/1964 | Burwell | 340—234 X |
| 3,258,759 | 6/1966 | Bernstein | 340—235 |

RICHARD M. WOOD, *Primary Examiner.*

C. L. ALBRITTON, *Assistant Examiner.*

U.S. Cl. X.R.

73—170; 200—61.04; 340—235; 307—116; 338—244